Dec. 8, 1970 T. R. SPECHT ET AL 3,546,572
THREE-PHASE TRANSFORMER POWER SUPPLY EMPLOYING CAPACITORS
AND CLAMPING DEVICES TO SUPPRESS VOLTAGE SURGES
Filed Dec. 10, 1968
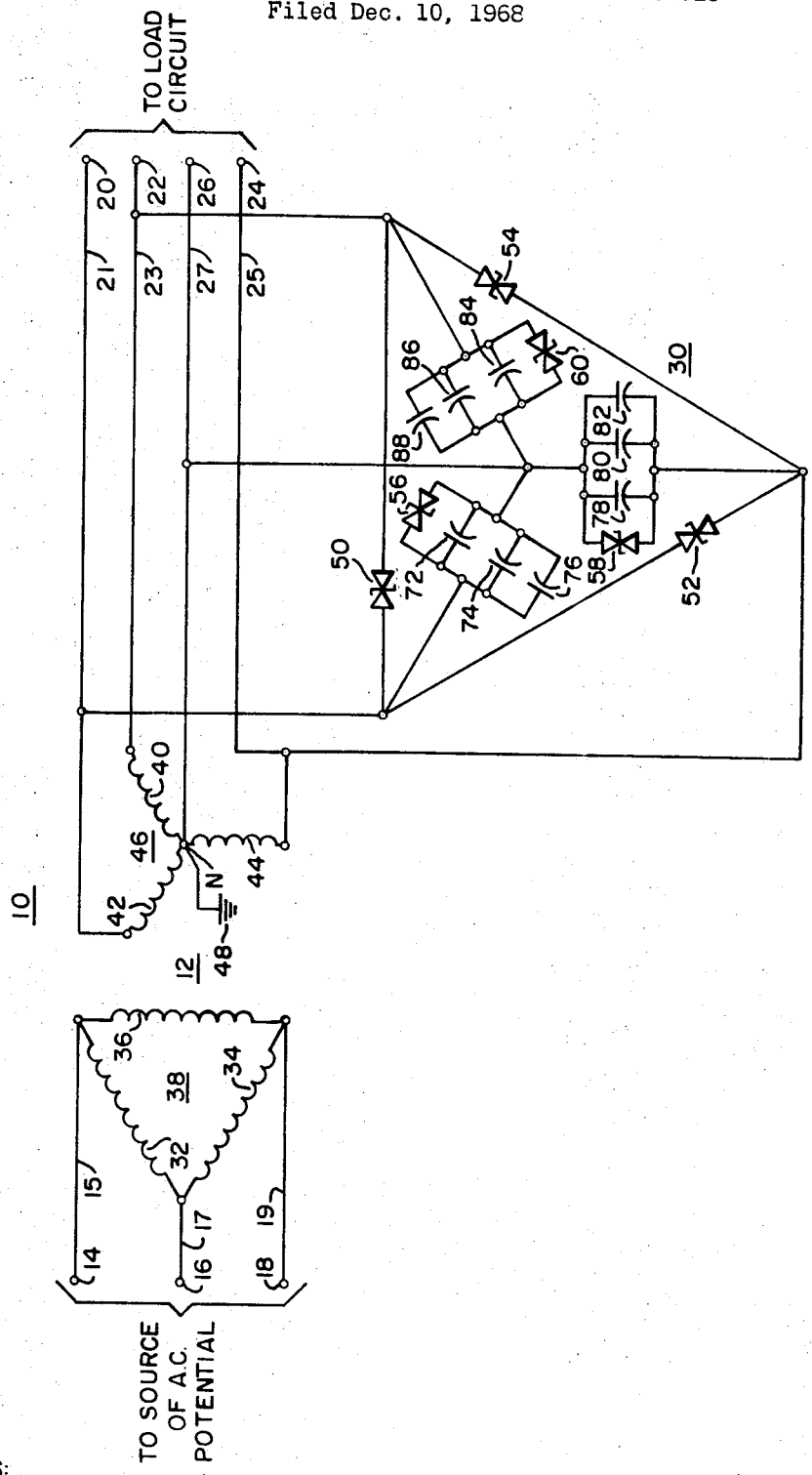
WITNESSES:
Bernard R. Giguere
James T. Young
INVENTORS
Theodore R. Specht, Gilbert D. Throop
and Robert V. Bruce.
BY
Donald R. Lackey
ATTORNEY

United States Patent Office 3,546,572
Patented Dec. 8, 1970

3,546,572
THREE-PHASE TRANSFORMER POWER SUPPLY EMPLOYING CAPACITORS AND CLAMPING DEVICES TO SUPPRESS VOLTAGE SURGES
Theodore R. Specht, Sharon, and Gilbert D. Throop, West Middlesex, Pa., and Robert V. Bruce, Masury, Ohio, assignors to Westinghouse Electric Corporation, Pittsburgh, Pa., a corporation of Pennsylvania
Filed Dec. 10, 1968, Ser. No. 782,519
Int. Cl. H02p *13/04;* G05f *3/00*
U.S. Cl. 323—61                                 8 Claims

ABSTRACT OF THE DISCLOSURE

A three-phase power supply, including a transformer, and a filter network for limiting the magnitude of transient and surge voltages in the output of the transformer. The filter network includes capacitors for absorbing energy from transient or surge voltages having a relatively short time duration, and voltage clamping devices having Zener type characteristics for absorbing the longer time, high voltage transients.

BACKGROUND OF THE INVENTION

Field of the invention

The invention relates in general to alternating current power supplies, and more specifically to three-phase alternating current power supplies having means for filtering transient and surge voltages in its output.

Description of the prior art

Alternating current power supplies for sensitive electronic, solid state apparatus, such as computers, are an important link in the successful operation of the apparatus. Further, certain types of solid state apparatus, such as the large industrial type computer, require a three-phase AC supply voltage provided by a three-phase transformer, or three single-phase transformers, with the secondary windings of the transformers being wye connected to provide line-to-neutral voltages, as well as line-to-line voltages. In addition to a transformer for transforming the three-phase power system voltage to the magnitude the apparatus is designed to utilize, some means must be provided for limiting the magnitude of transient and surge voltages. Transient and surge voltages in the output voltage waveform of a computer power supply may cause erratic operation and/or failure of certain of the semiconductor or solid state components of the computer. Attempts to filter or absorb the transient and surge energy by voltage clamping means connected line-to-line in the output of the power supply transformer have not been successful. Therefore, it would be desirable to provide a new and improved three-phase AC power supply for electronic apparatus, such as computers, which will provide complete protection for the connected apparatus against surge and transient voltages.

SUMMARY OF THE INVENTION

Briefly, the present invention recognizes that line-to-line voltage, clamping means, by itself, is not sufficient protection for the output voltage of a three-phase power supply, and that line-to-neutral voltage clamping means, by itself, is also not sufficient protection. Both types of protection are required, in order to protect against substantially in-phase line-to-neutral transient voltages, as well as unbalanced transient voltages. Further, the invention recognizes that clamping the line-to-line and line-to-neutral voltage of a three-phase power supply provides only partial protection for the connected load. Short duration surge voltages having an extremely fast rise and fall time, but a magnitude less than the clamping magnitude, are equally inimical to the solid state devices, as they have a maximum time rate of change voltage rating, which if exceeded will cause them to fail. Further, the short duration, fast rise time voltage pulses are transmitted through the capacitance between the primary and secondary windings of the step-down transformer of the three-phase power supply without transformation, as well as through additional step-down transformers in the connected apparatus for providing the relatively small magnitude control voltages required by certain semiconductor devices. Thus, while these surge voltages may be a relatively small fraction of the magnitude of the distribution voltage of the electrical utility, and may be below the magnitude of the clamping voltage in the three-phase power supply, they may be several times the maximum operating voltage of the semiconductor devices after passing through all of the step-down transformers between the source of the surge potential and the semiconductor devices, since they are not subject to the step-down ratios of the transformers.

The invention is a new and improved three-phase AC power supply, which provides complete protection against all of the transient and surge phenomena revealed in the hereinbefore enumerated understanding of their natures. The power supply includes a three-phase transformer, having a primary winding adapted for connection to the electrical power system, and a secondary winding adapted for connection to the load circuit. The secondary winding is wye connected to provide both line-to-neutral and line-to-line voltages. A transient voltage filter is connected to the secondary winding, which includes capacitors connected line-to-neutral, and voltage clamping means applied line-to-neutral, and line-to-line. The capacitors and voltage clamping means cooperate to provide complete transient and surge voltage protection for the connected load, with the capacitors absorbing and smoothing the fast rise time, short duration pulses, and the voltage clamping means absorbing the relatively long time transients having higher magnitudes.

BRIEF DESCRIPTION OF THE DRAWING

Further advantages and uses of the invention will become more apparent when considered in view of the following detailed description and drawing, in which the single figure is a schematic diagram of a three-phase power supply and transient filter network constructed according to the teachings of the invention.

DESCRIPTION OF THE PREFERRED EMBODIMENT

Referring now to the drawing, the single figure is a schematic diagram which illustrates a new and improved three-phase AC power supply 10, constructed according to the teachings of the invention. In general, power supply 10 includes a transformer 12 having input terminals 14, 16 and 18 adapted for connection to a source of three-phase alternating potential (not shown), output terminals 20, 22 and 24, and a neutral terminal 26, adapted for connection to a load circuit (not shown), and a filter network 30 for suppressing and absorbing transient and surge voltages.

Transformer 10 may be a single three-phase transformer having primary phase windings 32, 34 and 36, and secondary phase windings 40, 42 and 44, or three single-phase transformers may be used, as desired. The primary phase windings 32, 34 and 36 may be connected to provide a three-phase delta winding 38, as illustrated in the figure, which has its terminals connected to the input terminals 14, 16 and 18 via conductors 15, 17 and 19, respectively, and the secondary phase windings are connected to provide a three-phase wye winding 46 having a neutral terminal N. Winding 46 is connected to output terminals 20, 22 and 24 via conductors 21, 23 and 25, respectively, and its neutral terminal N is connected to terminal 26 via conductor 27. The neutral terminal N may be grounded, as shown at 48.

The transient voltage filter network 30 includes voltage clamping means 50, 52 and 54 connected line-to-line in the secondary circuit of the transformer 12, and voltage clamping means 56, 58 and 60 connected line-to-neutral in the secondary circuit of the transformer 12. Line-to-line clamping means 50 is connected between conductors 21 and 23, line-to-line clamping means 52 is connected between conductors 21 and 24, and line-to-line clamping means 54 is connected between conductors 23 and 25.

Line-to-neutral clamping means 56 is connected between conductors 21 and 26, line-to-neutral clamping means 58 is connected between conductors 25 and 27, and line-to-neutral clamping means 60 is connected between conductors 23 and 27.

The line-to-line and line-to-neutral clamping means may be selenium rectifiers or cells which have been specially processed to obtain a Zener type characteristic, and which are serially connected back-to-back to provide a discharge path in either direction, i.e., non-polarized; or, any suitable voltage clamping means having a Zener type characteristic may be used, such as silicon semiconductor diodes or rectifiers of the Zener type, which are serially connected back-to-back. The selenium type of rectifier is particularly attractive on high voltage, high power applications due to their self-healing characteristic, their stability across a wide temperature range, their reliability, and their general ability to withstand abuse, as well as being relatively inexpensive in power ratings. Selenium suppressor rectifiers or cells are available which have rated clamping voltages equal to 2.5 or 2.8 times the RMS steady state voltage rating of the cells.

Applying voltage clamping means from line-to-line, and from line-to-neutral is not a redundant application of the clamping means. It was recognized that transient and surge voltages may occur at random, without regard to the phases of the various voltages of the three-phase system, and further that the transient and surge voltages may be unbalanced, i.e., occur with a greater magnitude in one phase than in another phase of the system. Thus, applying voltage clamping means solely line-to-line would clamp the line voltages, but it would not control the magnitude of the individual phase voltages, which may become excessive without having a resultant voltage across two of the phases which exceeds the clamping voltage rating of the line-to-line clamping means.

Further, applying voltage clamping means solely line-to-neutral would clamp the phase voltages, but it would not limit the line-to-line voltages to $\sqrt{3}$ times one of the phase voltages, since the transient voltages of the phases may be in phase with one another. For example, if the phase voltages are rated 120 volts RMS, the normal line-to-line voltage would be 208 volts. Using selenium type voltage clamping devices having a steady state RMS voltage rating of 120 volts connected across the phases, and a voltage clamping rating of 2.5 times their steady state RMS voltage rating, the voltage from line-to-line may rise as high as 600 volts when the transient voltages are in phase with one another. Adding voltage clamping devices line-to-line rated 208 volts RMS and having a voltage clamping rating of 2.5 times their steady state RMS rating, reduces the maximum line-to-line voltage from 600 to 500 volts, a 13% reduction.

Voltage clamping means applied line-to-line and line-to-neutral will clamp the line and phase voltages of the three-phase power supply to known maximum magnitudes, and will protect the connected load from high magnitude transients having a relatively long duration, i.e., in the order of many microseconds. Transients of this type are produced by lightning striking the electrical power distribution system, switching surges produced when large blocks of power are switched into or out of the electrical system, line-to-ground faults in the electrical power distribution system, or in the plant electrical system in which the computer is installed, and other types of industrial plant disturbances which may unbalance the electrical system.

It was recognized, however, that clamping the line and phase voltage outputs of the three-phase power supply would still not provide complete protection for the connected load. Surge voltages in the electrical system having extremely short duration, i.e., less than a microsecond, such as those caused by corona or partial discharges at a point or points in the high voltage electrical distribution system where the insulation is deteriorating, are transmitted through a transformer without transformation, via the capacitance between the primary and secondary windings. For example, a 100 volt corona surge in a 15 kv. distribution system would appear as a 100 volt surge in the secondary of a 15 kv. to 2400 volt step-down transformer. Then, when the 2400 volt system is stepped down to 120 volts line-to-neutral, or 208 volts line-to-line in a computer power supply transformer, the corona surge would still have a magnitude of substantially 100 volts in the line-to-neutral output voltage of the transformer. The computer itself has additional step-down transformers which obtain the control voltages for the various computer functions, and the corona surge would pass untransformed into the secondaries of these transformers, where it may be many times the desired output voltage of the step-down control transformer. The voltage clamping devices hereinbefore described, will not protect the computer against these short duration voltage surges.

Therefore, to complete the filter network 30 shown in the figure, capacitors are connected line-to-neutral across the secondary winding 46 of the power supply transformer 12. The capacitors, which are chosen to have a good high frequency characteristic, will absorb the short duration surge pulses of either polarity, and prevent them from being transmitted into the load circuit. Specifically, three capacitors are illustrated in the figure connected across each phase of secondary winding 46, with capacitors 70, 72 and 74 being connected from conductor 21 to neutral conductor 27, capacitors 78, 80 and 82 being connected between conductors 25 and 27, and capacitors 84, 86 and 88 being connected between conductors 23 and 27. The actual number of capacitors and their values will depend upon the specific application. For example, in a three-phase power supply having a three-phase transformer rated 150 kv., 2400 volt delta connected primary and 208/120 volt Y connected secondary, 120 volt selenium cells having a clamping voltage of 300 volts were connected line-to-neutral, 208 volt selenium cells having a clamping voltage of 520 volts were connected line-to-line, and three capacitors were connected from each of the lines to neutral, with one of the capacitors being a .01 microfarad ceramic disc capacitor and the remainining two capacitors being one microfarad extended foil type capacitors. This arrangement was found to provide the required voltage transient protection for an industrial computer connected thereto.

The AC filter network 30 shown in the figure thus provides complete voltage transient and surge protection for a load connected to the three-phase power supply 10, with the capacitors and voltage clamping means complementing one another, each providing protection where the other is ineffective. The capacitors provide protection against the steep wave front short duration transient or surge voltages, as the capacitors draw current from the very start of the surge voltage, and thus absorb the energy of the surges. The longer duration, higher magnitude transient voltages, are clamped to predetermined maximum transient voltages, at the secondary of the power supply transformer 12. The capacitors are not as effective on this type of transient, as they do not have a clamping characteristic, but would continue to charge to the peak of the surge potential.

The filter network 30 and transformer 12 cooperate to provide a new and improved power supply 10 for sensitive electronic loads, such as a computer, with the transformer 12 providing the high series impedance necessary for effective filter operation. The filter requires a high series impedance to drop the system voltage across when it starts to draw current during a transient or surge potential. However, it will be understood that the filter network 30 may also be used effectively with other means for providing a high series impedance, such as series reactors connected in series with the line conductors. As illustrated in the figure, the filter 30 may be provided as a complete package, interconnected and ready for connection to an electrical power system, by connecting the capacitors in a Y configuration, by connecting first voltage clamping means across the capacitors, and by connecting second voltage clamping means having a rating equal to $\sqrt{3}$ times the rating of the first voltage clamping means, across the output terminals of the Y connected capacitors.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

We claim as our invention:

1. A three-phase filter network for absorbing energy from transient and surge voltages in an AC electrical power system, comprising:
   capacitor means connected in a three-phase Y arrangement, having output terminals and a neutral terminal, said terminals being adapted for connection to the AC power system,
   first voltage clamping means connected between each output terminal and the neutral terminal,
   and second voltage clamping means connected between each different pair of output terminals.

2. The three-phase filter network of claim 1 wherein the voltage clamping rating of the second voltage clamping means is substantially equal to $\sqrt{3}$ times the voltage clamping rating of the first voltage clamping means.

3. The three-phase filter network of claim 1 wherein the first and second voltage clamping means each include at least two selenium rectifiers of the type having a Zener characteristic, connected serially back-to-back.

4. The three-phase filter network of claim 1 wherein the first and second voltage clamping means each include at least two silicon Zener diodes, connected serially back-to-back.

5. A three-phase power supply, comprising:
   a three-phase transformer having primary and secondary windings, said primary winding having input terminals adapted for connection to a source of three-phase alternating potential, said secondary winding being Y connected, having output terminals and a neutral terminal,
   and a filter networkwork for absorbing energy from transient and surge voltages applied to said output terminals, said filter network including capacitor means connected from each of said output terminals to said neutral terminal, first voltage clamping means connected from each of said output terminals to said neutral terminal, and second voltage clamping means connected between each different pair of said output terminals.

6. The three-phase power supply of claim 5 wherein the voltage clamping rating of the second voltage clamping means is substantially equal to $\sqrt{3}$ times the voltage clamping rating of the first voltage clamping means.

7. The three-phase power supply of claim 5 wherein the first and second voltage clamping means each include at least two selenium rectifiers of the type having a Zener characteristic, connected serially back-to-back.

8. The three-phase power supply of claim 5 wherein the first and second voltage clamping means each includes at least two silicon Zener diodes, connected serially back-to-back.

References Cited

UNITED STATES PATENTS

| | | | |
|---|---|---|---|
| 2,157,886 | 5/1939 | Cuttino | 307—105 |
| 3,173,029 | 3/1965 | Nadolsky | 307—93 |
| 3,308,311 | 3/1967 | Swanson | 307—93 |
| 3,332,000 | 7/1967 | Greening et al. | 317—49X |

J D MILLER, Primary Examiner

G. GOLDBERG, Assistant Examiner

U.S. Cl. X.R.

307—93, 105; 323—76, 81, 88